July 31, 1951 — T. P. HALL ET AL — 2,562,492
MEANS FOR LOCKING DETACHABLE LOADS TO AIRCRAFT
Filed June 11, 1948 — 2 Sheets-Sheet 1
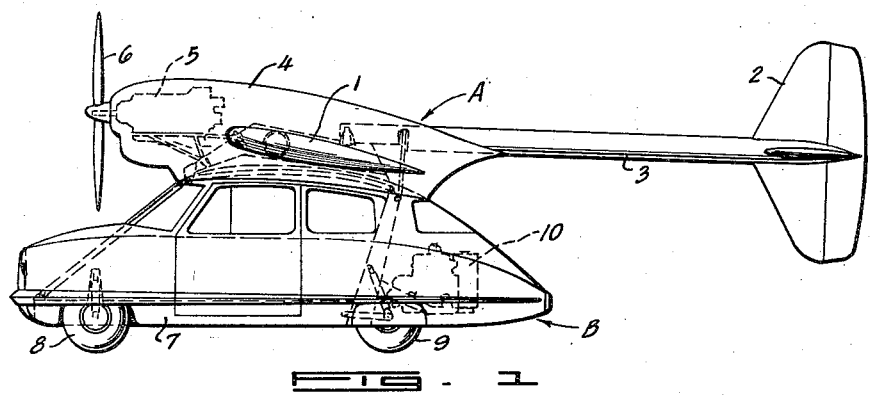
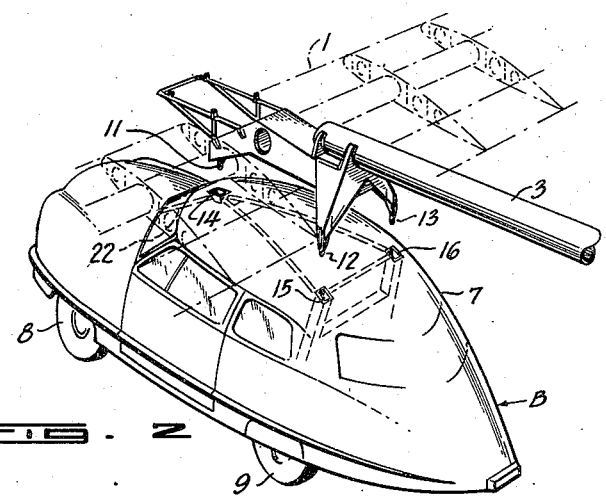
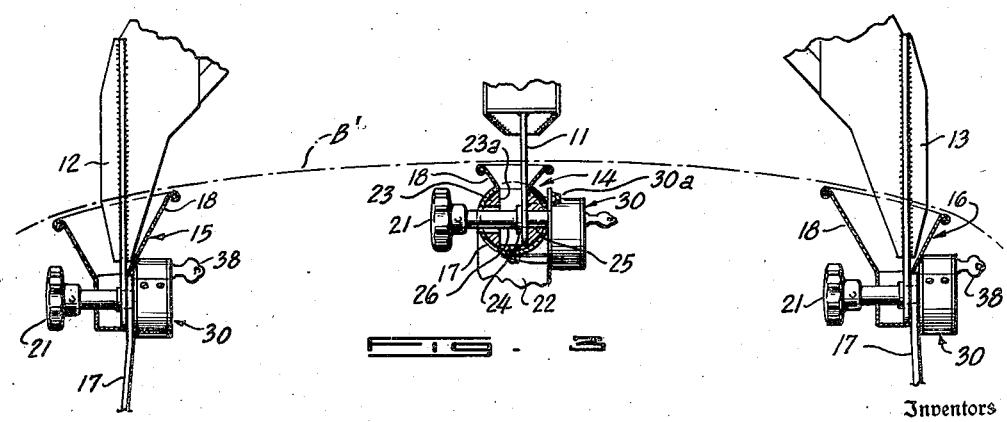
Inventors
Theodore P. Hall
& Edgar P. Rhodes
Attorney

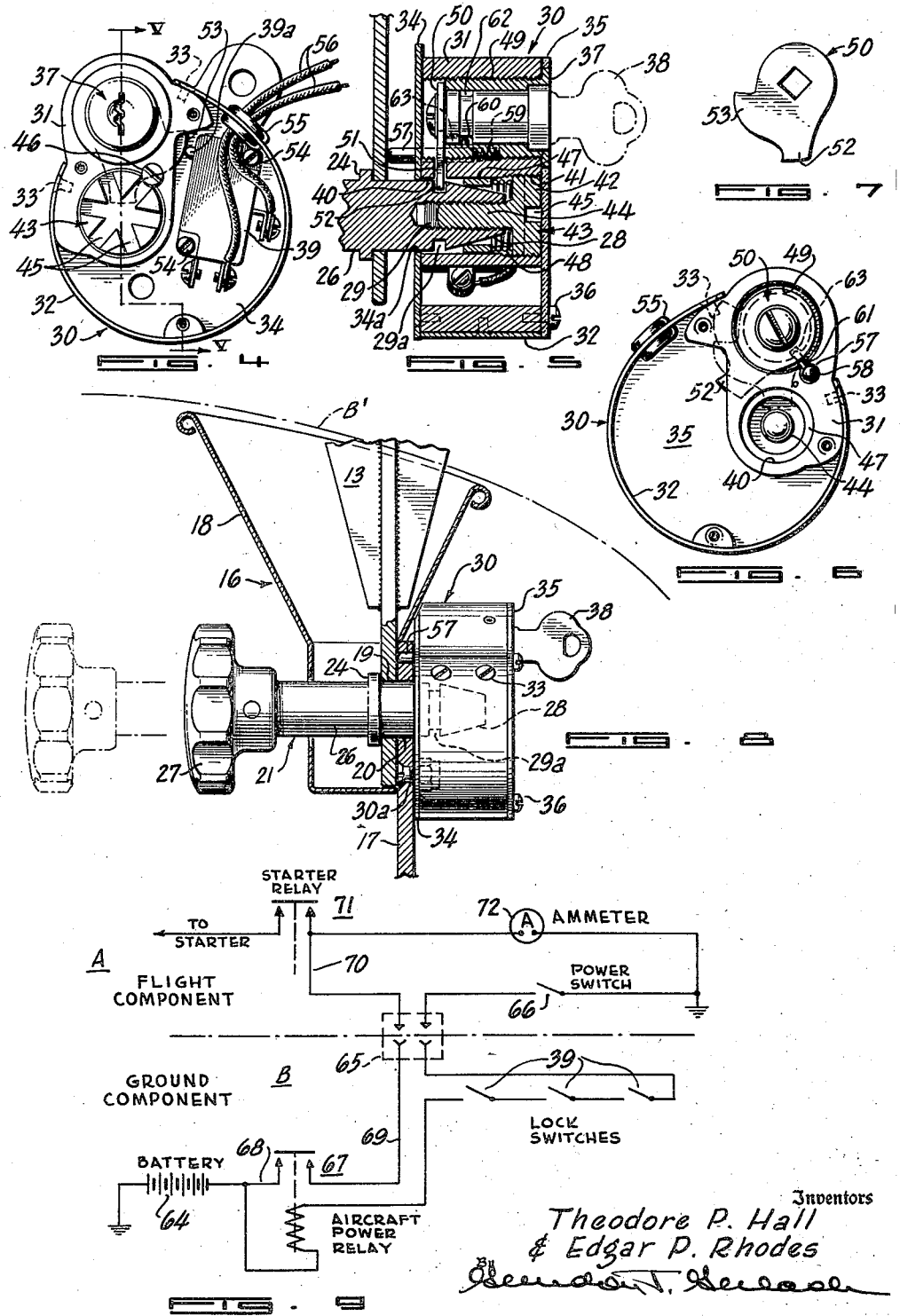

Patented July 31, 1951

2,562,492

UNITED STATES PATENT OFFICE 2,562,492

MEANS FOR LOCKING DETACHABLE LOADS TO AIRCRAFT

Theodore P. Hall, San Diego, and Edgar P. Rhodes, La Jolla, Calif., assignors, by mesne assignments, to Theodore P. Hall, San Diego, Calif.

Application June 11, 1948, Serial No. 32,398

11 Claims. (Cl. 244—2)

This invention relates to improvements in the attachment of a flight component to loads normally adapted for ground transmission or conveyance to permit their being airborne and comprehends a means for positively locking one to the other in such a manner as to prevent the operation of the assembly as an airborne unit unless the attachment has been properly and securely accomplished. There are many applications whereby an independently powered flight component is adapted to be detachably connected to an assembly which is normally designed for use on the ground. One important example is shown and described in co-pending application No. 763,859, filed July 26, 1947 by T. P. Hall which exemplifies the general arrangement of a flying automobile consisting of a four wheeled vehicle adapted for use on the ground and being provided with attachment means for a flight component comprising wings, an empennage, a power plant, and the necessary flight and engine controls, for the purpose of allowing the assembly to become airborne. While we have utilized this embodiment for the purpose of illustrating the present invention, it is to be clearly understood that the latter has equivalent utility in other applications where a flight component is adapted for attachment to a ground load, such for example, as in the attachment of auxiliary load compartments, airplane supported military vehicles, etc. The principal purpose of the present invention is to provide a positive locking means for the attachment of a flight assembly to a detachable load incorporating means whereby the assembly cannot be operated as an aircraft if the connection between the two components has not been properly secured and positively engaged.

In the flying automobile with which we have chosen to exemplify our invention, it is contemplated that the flight component be removed in entirety from the ground vehicle when the latter is used for ground travel, and stored at an airport for reassembly with the ground vehicle when it is desired that the combination be used as an aircraft. The utility of this conveyance depends to a large extent upon the convenience and simplicity of assembling the flight component to the ground component and obviously demands a positive means for locking the two elements together to eliminate the possibility of failure of the attachment during take-off, flight, or landing.

The present invention, therefore, has for its primary object the provision of a simple and positive means of attaching and locking a flight component to a ground load in order to permit the load to be airborne.

A further object of the invention is to provide a means for locking a flight component to a detachable load whereby the assembly cannot be utilized as an aircraft unless the flight component is positively secured and locked to the detachable load.

A still further object of the present invention is to provide a simple and positive locking means between a flight component and a ground component, combined with electrical means preventing the operation of the flight component to cause the assembly to become airborne unless the engagement means is in position so that the loads of one component are fully and completely transmitted to the other.

A still further object of the invention is to provide an attachment means between a flight component and a ground component of a vehicle as described herein, combined electrically with the starting system of the flight component's power plant in such a manner that the latter may not be started or operated unless the attachment means is positively engaged.

Further objects of the invention will be apparent from the following specification and the accompanying drawings in which like numerals of reference denote like parts in the several views thereof.

In the drawings:

Fig. 1 is a side elevation showing the general arrangement of a flying automobile in which the present invention is embodied and is particularly useful;

Fig. 2 is a perspective of the flying automobile illustrating the means of attaching the flight component to the ground component and the location of the attachment fittings;

Fig. 3 is a general view of the vehicle looking forward to illustrate the location and use of the means comprehended by the present invention in a vehicle of the type shown in Figs. 1 and 2;

Fig. 4 is an end view of the locking means of the present invention having certain parts thereof removed for the purpose of clarity;

Fig. 5 is a section of the locking means on the line V—V of Fig. 4;

Fig. 6 is a further view of the locking means taken from the opposite side from Fig. 4, and with a cover removed for clarity;

Fig. 7 is a detail view illustrating a cam embodied in the lock of this invention for performing certain operations;

Fig. 8 is an enlarged detail of the installation of one lock showing the interrelation of the attachment fittings of the flight and ground components, and the means for positively locking the two together;

Fig. 9 is a schematic wiring diagram illustrating the connection of the locking means of the present invention with the starter circuit for the power plant of the flight component.

The present invention is described and shown in connection with the attachment of a powered flight component A to an independently powered ground component B to permit the vehicle to become airborne. In this embodiment, the flight component consists of wings 1, an empennage 2 joined to the structure of the wings by a tail boom 3 and an internal combustion engine 5 driving a propeller 6 supported within a cowled nacelle 4. The ground component B comprises an enclosed shell-like body 7 supported on a frame which additionally carries a pair of forward steering wheels 8 and a pair of rear drive wheels 9 having an operative connection with a power plant 10. With the flight component A detached, the ground component B is usable as an automobile. When attached, the flight and engine controls of the flight component are operable by an occupant of the ground unit B, for operating the combined vehicle as an aircraft.

The arrangement and structure of the components of the flying automobile described herein do not form a part of this invention and are used purely for the purpose of illustrating the application and general utility of the present invention. In addition to the embodiment shown, the invention has similar utility in flying automobiles having foldable wings for travel on the ground where it may be employed to lock the wings into flight position and to prevent the use of the vehicle for flight unless the lock is positively engaged by controlling some part of the electrical system utilized by the vehicle for flight. Other useful applications of the present invention will be apparent from the following description.

In the drawings, the flight component A is provided with three depending plate-like upper attachment fittings 11, 12, and 13 which are secured as by welding to the central structural elements of the flight component and which are adapted to mate and engage respectively lower attachment fittings 14, 15, and 16 provided on the top of the ground component B, the latter being secured to the frame of the ground component in such a manner that the entire load of the ground component is efficiently transmitted to the structure of the flight component A when the upper and lower fittings are mated and locked together and when the assembly is airborne.

Fig. 3 represents a view looking forward from a position behind the rear lower attachment fittings with the flight component A attached to the ground component B by the locking means comprehended by the present invention. The broken line B¹ represents the roof contour of the ground component B.

The rear lower attachment fittings 15 and 16 comprise flat structural elements 17 forming a part of the frame of the ground component B and are adapted to mate with the upper attachment fittings 12 and 13 respectively, and to transmit loads thereto by means of locking pins 21 which are manually insertable through holes 19 and 20 in the upper and lower rear attachment fittings respectively serving as shear members. The front lower attachment fitting 14 is shown in Fig. 3 as being associated with a tube 22 on the fore-and-aft centerline of the ground component B and which is a part of the latter's primary structure. A plug 23 is secured within the tube 22 by welding or pinning and an open transverse recess 23ª through the top of tube 22 and into the plug 23 is provided to receive and position the upper attachment fitting 11. The tube 22 and plug 23 are transversely drilled through one side to clear a shoulder 24 on the locking pin 21, and the other side is drilled at 25 to accommodate the elongated stud portion 26 of the pin 21. On assembly, with the upper attachment fitting 11 positioned within the recess 23ª, one of the pins 21 is manually inserted through the transverse holes in the lower attachment fitting 14, and through a hole in the fitting 11 which corresponds to the hole 25 in the fitting 14, and serves as a shear member between the two elements and to transmit loads from one to the other.

Each of the three lower fittings 14, 15, and 16 are provided with an upwardly divergent sheet metal shroud 18 which guides and positions the upper attachment fittings 11, 12, and 13 into cooperation with the lower fittings 14, 15, and 16 respectively, so that the holes therein are aligned to permit ready insertion of the three locking pins 21 in attaching the flight component A to the component B. The shrouds 18 of the rear fittings 15 and 16, and the recess 23ª of the lower front fittings are proportioned to allow a certain amount of lateral play between the mating parts of the attachment fittings during assembly, which is taken up during the operation of seating the pins 21, by means to be described.

From the foregoing, it will be seen that the general method of transmitting loads between the two components A and B is by means of a plurality of mating attachment fittings having cooperating holes which are adapted to accommodate pins 21 serving as shear members.

One of the principal purposes of the present invention resides in the provision of means to positively lock the attachment means against accidental displacement or failure during operation. This feature is exemplified in the use of locking assemblies 30, one of which is associated with each of the fittings 14, 15, and 16 and fastened to the structure thereof by bolts 30ª in such a manner as to engage and lock the distal ends of the pins 21 when the latter are inserted through the mated holes of the attachment fittings.

Each locking pin 21 consists of a cylindrical elongated stud portion 26 to which is threaded and pinned a serrated handle 27 at one end. The other end 28 is tapered and has a threaded internal bore 29 and a circumferential recess 29ª spaced therefrom. An integral shoulder 24 is machined on the stud portion 26.

The locking assembly 30 comprises essentially a solid body portion 31, a semi-circular shield 32 attached at its free ends to the body portion 31 by screws 33, a pair of cover plates 34 and 35 fastened by screws 36 to the opposite sides of the assembly to form an enclosed container, a cylinder lock 37 operated conventionally by a removable key 38, and a microswitch 39.

A transverse circular bore 40 having a slightly larger diameter than that of the stud portion 26 of the locking pin 21 is drilled through the body portion 31. In assembly, the locking members 30 are supported from the structures 17 and 22 in such a manner that the bore 40 of each coincides with the centerline of the mating holes 20 in order to receive the tapered ends 28 of the pins 21 on installation. The outer end of the bore 40 is threaded at 41 to engage the head portion 42 of an adjusting pin 43. The adjusting pin 43 is provided with an integrally formed axial stud 44 which is externally threaded to engage the threaded bore 29 of the locking pin 21. The head portion 42 has a number of radial recesses 45 which provide means for rotating the adjusting pin 43 to establish its relation transversely in the locking member 30. The recesses 45 also serve to partially engage the head of a lock screw 46 which is tapped into the body portion 31 to prevent rotation of the pin 43 after its adjustment.

A freely slidable ring 47 is held within the bore 40 and is normally urged towards the cover plate 34 by a compression spring 48 bearing against the head portion 42. A hole 34a in the cover plate 34 corresponds in alignment to the bore 40 and is sufficiently smaller in diameter to clear the lock pin stud 26, but to act as a stop to retain the ring 47 within the bore when the locking member 30 is not engaged with the pin 21.

A second transverse bore 49 in the body member 31 is threaded to support a conventional cylinder lock assembly 37 so that the keyhole is accessible through a suitable opening the outer cover plate 35. The rotatable barrel of the cylinder lock 37 carries a square stud on its inner end which supports a cam 50 for rotation by means of the key 38.

The cam 50 is disposed in a slot 51 in the body portion 31 which extends through and communicates with the bore 40. The cam 50 is formed with a lobe 52 which is projected into or out of the bore 40 as a result of rotation of the key 38. The cam 50 additionally carries a switch-operating lobe 53 which is in position to actuate the micro-switch 39 by engagement with the control contact 39a. The micro-switch 39 is supported in fixed relation to the cam 50 by screws 54 tapped into the cover 34. Rotation of the cylinder lock 37 to extend the cam lobe 52 into the bore 40, simultaneously closes the micro-switch 39 by contact of the cam lobe 52 against the contact 39a. When the lobe 52 is rotated so that it is out of engagement with the bore 40, the lobe 53 is out of engagement with the contact 39a and the switch 39 is then in an open position. A grommet 55 through the shield 32 is provided to protect wires 56 leading from the switch 39.

When the locking member 30 is not in use, i. e., when the pin 21 is not in position, the ring 47 under action of the spring 48 covers the opening of the slot 51 into bore 40, and prevents rotation of the lock 37 since the cam 50 cannot be rotated due to the engagement of the lobe 52 against ring 47, and the switch 39 cannot be closed. When the pin 21 is inserted through the hole 20 and rotated to engage the threaded bore 29 to the stud 44, the tapered end 28 of pin 21 moves the ring 47 inwardly and exposes the slot 51 to the bore 40. The adjusting pin 43 is set so that when the pin 21 bottoms on the threaded stud 44, the circumferential recess 29a is aligned with the slot 51, permitting the cam lobe 52 to be rotated into the recess 29a to lock the pin 21 in relation to the locking member 30 and prevent inadvertent withdrawal of the pin without unlocking the assembly by means of the key 38.

Additional means are provided to insure that the locking member cannot be operated unless the upper attachment fittings are in proper mating engagement with the lower fittings. A pin 57 is slidably supported in the body member 31 in a transverse hole 58 adjacent and parallel to the bore 49, and is urged outwardly by means of a small compression spring 59. A suitable hole in the cover plate 34 accommodates the projecting end of the pin 57. The inner end of the pin 57 carries a small projection 60 which extends into the bore 49 through a slot 61 between the hole 58 and the bore 49 and into a circumferential recess 62 in the barrel of the cylinder lock 37. When the cylinder lock is in the unlocked position, a slot 63 in its outer case is aligned with the projection 60 positioning the pin 57 to the left in the drawings under the action of the spring 59 and thus preventing rotation of the cylinder lock 37 until the pin 57 is depressed to a position in which the projection 60 again is positioned within the recess 62. The cylinder lock 37 may then be rotated by means of the key 38.

In installing the pins 21 to mate and lock the attachment fittings of the assembly, the shoulder 24 of each pin engages the upper fittings 11, 12, and 13 and forces them toward the respective locking member 30 as the pins are screwed into place under action of the threaded connection between pins 21 and studs 44. At the same time, the inner faces of the fittings 11, 12, and 13 contact the projecting ends of the pins 57 releasing the cylinder locks 37, so that they may be actuated when the pins 21 are bottomed in the bores 40, to extend the cam lobes 52 into the recesses 29a thus locking the pins 21 against withdrawal.

An important feature of the present invention resides in the provision of means to prevent operation of the airborne assembly unless the attachment fittings are positively secured and locked. In the present embodiment this is accomplished by connecting the three switches of the locking members in series in the electrical circuit supplying power to the starting motor of the flight component power plant 5. By this arrangement, the power plant 5 cannot be started unless all of the switches are in contact indicating that the attachment fittings are properly seated and locked. A typical embodiment of this feature is schematically illustrated in Fig. 9. In this arrangement a storage battery 64 located in the ground component B normally provides a source of electrical energy to start and operate the ground component power plant 10 (Fig. 1), and is connected to the electrical circuit of the flight component A when in assembled position by a releasable connection 65. One side of a master power switch 66 in the flight component is grounded, and the other side is connected in series with the three micro-switches 39 associated with the attachment fittings, as has been described, and through the operating coil of a relay 67 to the battery 64. When the connection 65 is in engagement, the relay 67 controls the flow of current from the battery 64 through the leads 68, 69, and 70 to a starter relay 71 to operate the starter of the flight component power plant 5 (Fig. 1). An ammeter 72 is provided in the flight component to indicate whether power is available in its electrical system.

With the flight and ground components assembled and the master power switch 66 closed, the relay 67 is only actuated to close the power circuit to the flight component starter relay 71 if all three of the lock switches 39 are closed indicating that the attachment fittings between the two elements are properly secured and locked. In this condition, the starter relay 71 may be operated as desired to energize the starter for operation of the power plant 5 for flight purposes. In the event that any one of the lock switches 39 is open due to faulty engagement of the attachment fitting, the circuit to the relay 67 is interrupted and the flow of current to the flight component B is thus prevented.

While the electrical control means associated with the locking mechanism is described herein in conjunction with a starting mechanism for a power plant, it will be obvious to those skilled in the art that the arrangement is capable of use with equal advantage to control other electrical functions, for example, an ignition system, electrical actuators for flight controls, or landing gear locks, where it may be desirable to prevent operation of certain elements of an assembly unless a positive lock has been obtained between the assembly and a detachable or releasable external load.

The invention is not to be understood as restricted to the specific details set forth herein, since these may be modified without departing from the spirit and scope of the invention as set forth in the following claims.

Having thus described our invention, what we claim as new and desire to secure by Letters Patent is:

1. Means for locking a detachable load to an aircraft comprising; an attachment fitting on said aircraft; a mating attachment fitting on said detachable load; releasable means connecting said attachment fittings in mated relation and transmitting loads therebetween; said releasable means being removable as a unit from the position connecting said fittings in mated relation for disconnection of the fittings; a manually actuatable locking means supported in normal permanently fixed position on one of said attachment fittings and being operable to engage and lock said releasable means against inadvertent removal thereof from the position connecting said fittings in mated relation; and means operatively engaged with said locking means for preventing actuation of the locking means until engaged by said releasable means when the latter is in the position connecting said attachment fittings in mated relation.

2. Means for locking a detachable load to an aircraft comprising; an attachment fitting on said aircraft; a mating attachment fitting on said detachable load; releasable means connecting said attachment fittings in mated relation and transmitting loads therebetween; said releasable means being removable from the position connecting said attachment fittings in mated relation for disconnection of the fittings; a manually actuable locking means supported in normal permanently fixed position on one of said attachment fittings and being operable to engage and lock said releasable means against inadvertent removal thereof from the position connecting said fittings in mated relation; means operatively engaged with said locking means for preventing actuation of the locking means until engaged by said releasable means when the latter is in the position connecting said attachment fittings in mated relation; and additional means operatively associated with said locking means for preventing actuation of the locking means until said additional means is engaged by the other of said attachment fittings when said other fitting is in mated relation with the fitting on which said locking means is mounted.

3. Means for locking a detachable load to an aircraft comprising; an attachment fitting on said aircraft; a mating attachment fitting on said detachable load; a releasable pin connecting said attachment fittings in mated relation and transmitting loads therebetween; said releasable pin being removable from the position connecting said attachment fittings in mated relation for disconnection of the fittings; a locking means including an actuating key therefor; said locking means being supported in a normal permanently fixed position on one of said attachment fittings and being operable to engage and lock said releasable pin against removal when the latter is in the position connecting said fittings; and additional means operatively associated with said locking means and being normally engaged with and adapted to secure said locking means against actuation by said key until operated to a position releasing said locking means by engagement of the said additional means by said pin when the latter is in the position connecting said attachment fittings.

4. Means for locking a detachable load to an aircraft comprising; an attachment fitting on said aircraft having an opening therein; an attachment fitting on said detachable load having a mating opening therein; a releasable pin extended through said mating openings to connect said attachment fittings in mated relation and transmit loads therebetween; said pin being provided with a recess in one side thereof and a threaded portion at one end of the pin; a locking means provided with a threaded connection detachably engaging the threaded end of said pin with said fittings in mated relation, said locking means being mounted on and supported by one of said attachment fittings and including a key actuated cam member engaged in said pin recess upon locking actuation of said key with the threaded end of said pin and said threaded connection of the locking means in full threaded connection to lock said pin against displacement.

5. Means for locking a detachable load to an aircraft comprising; an attachment fitting on said aircraft; a mating attachment fitting on said detachable load; releasable means connecting said attachment fittings in mated relation and transmitting loads therebetween; said releasable means being removable as a unit from the position connecting said attachment fittings in mated relation for disconnection of the fittings; manually actuable locking means supported by one of said attachment fittings for operation to and from a position in locking engagement with said releasable means to lock said means against inadvertent removal thereof from the position connecting said fittings in mated relation; and a control means associated with said locking means and being operable thereby in response to actuation of said locking means to and from locking engagement with said releasable means.

6. Means for locking a detachable load to an aircraft comprising; an attachment fitting on said aircraft; a mating attachment fitting on said detachable load; releasable means connecting said attachment fittings in mated relation and transmitting loads therebetween; said releasable means being removable and replaceable as a unit from and to the position connecting said fittings in mated relation; manually actuable locking means mounted on one of said attachment fittings in normal permanently fixed position thereon; said locking means being operable to and from the position engaging said releasable means to lock the latter means against inadvertent removal and resulting disconnection of said attachment fittings; an electrical circuit; and electrical control means for said circuit operatively associated with said locking means and being operable to control said electrical circuit in response to actuation of said locking means to and from locking engagement with said releasable means.

7. Means for locking a detachable load to an aircraft comprising; an attachment fitting on said aircraft; a mating attachment fitting on said detachable load; releasable means connecting said attachment fittings in mated relation and transmitting loads therebetween; said releasable means being removable as a unit from the position connecting said attachment fittings for disconnection of said fittings from mated relation; locking means including an operating key therefor; said locking means being mounted in normal permanently fixed position on one of said attachment fittings and being operable by said key to and from a position locking said releasable means against inadvertent removal from the position connecting said fittings in mated relation; and an electrical switch operatively associated with said locking means for simultaneous actuation by the locking means when the latter is operated by said key to and from locking engagement with said releasable means.

8. Means for locking a detachable load to an aircraft comprising; an attachment fitting on said aircraft; a mating attachment fitting on said detachable load; a releasable pin connecting said attachment fittings in mated relation and being removable as a unit from said fittings for disconnection of the fittings; said releasable pin having a recess therein; locking means mounted on and supported by one of said attachment fittings; said locking means including a cam member operable by said locking means to and from a position engaged in the recess of said releasable pin when said pin and attachment fittings are in mated relation; control means operatively associated with said locking means; and means on said cam member operable to actuate said control means when the cam member is operated to or from the position engaged in the recess of said releasable pin.

9. In combination, an aircraft including a power plant therefor; a detachable load supported from said aircraft; means for detachably supporting said load comprising, an attachment fitting on said aircraft, a mating attachment fitting on said detachable load, and releasable means connecting said attachment fittings in mated relation and transmitting loads therebetween, said releasable means being removable as a unit from the position connecting said fittings in mated relation for disconnection of the fittings; a manually operable lock means mounted in normal permanently fixed position on one of said attachment fittings and being operable to and from locking position engaging said releasable means against inadvertent displacement; control means selectively operable to effect operation or non-operation of said aircraft power plant; connecting means between said control means and said aircraft power plant; and said control means being operatively connected with said lock means and being operable to effect non-operation of said power plant by actuation of said lock means from the position in locking engagement with said releasable means.

10. In combination, an aircraft having a power plant including electrical starting means and electrical circuits therefore; a detachable load supported from said aircraft; means for detachably supporting said load on the aircraft comprising, an attachment fitting on said aircraft, a mating attachment fitting on said detachable load, and releasable means connecting said attachment fittings in mated relation, said releasable means being removable as a unit from the position connecting said attachment fittings in mated relation for disconnection of the fittings; a manually operable lock means mounted on one of said attachment fittings and being operable to and from a position engaging said releasable means against inadvertent removal; electrical control means operatively associated with said lock means for operation simultaneously by operation of the lock means; an electrical circuit between said electrical control means and the electrical circuits of said power plant starting means for conditioning said starting means and circuits for operation or non-operation of said starting means; and said electrical control means being operable by actuation of said lock means to the position disengaged from said releasable means to open said control circuit to condition said starting means for non-operation.

11. In combination; an aircraft; a detachable load supported on said aircraft; a plurality of attachment fittings on said aircraft; a plurality of attachment fittings on said detachable load for mating with said fittings, respectively, on said aircraft; independent releasable means connecting in mated relation the fittings of each of said sets of attachment fittings, respectively, and transmitting loads therebetween; a lock means constituting a unit mounted on one attachment fitting of each set of mating attachment fittings and being operable to and from the position engaging the releasable means of such set of mated fittings to lock said releasable means against inadvertent removal and a position disengaged from and freeing said releasable means for removal; an electrical control means operatively associated with each lock means for actuation by operation of such lock means; and an electrical circuit connecting said electrical control means in series; and said electrical circuit being closed by said electrical control means only when all of the electrical control means are actuated by operation of all of said lock means to the positions in locking engagement with said independent releasable means, respectively, of the sets of mated attachment fittings.

THEODORE P. HALL.
EDGAR P. RHODES.

REFERENCES CITED

The following references are of record in the file of this patent:

UNITED STATES PATENTS

| Number | Name | Date |
|---|---|---|
| 1,294,415 | Curtiss et al. | Feb. 18, 1919 |
| 1,466,634 | Tarbox | Aug. 28, 1923 |
| 1,643,485 | Butters et al. | Sept. 27, 1927 |
| 2,215,003 | Johnson | Sept. 17, 1940 |

FOREIGN PATENTS

| Number | Country | Date |
|---|---|---|
| 533,900 | Great Britain | Feb. 21, 1941 |